(No Model.) 2 Sheets—Sheet 1.
W. R. GORRELL.
CHEESE CUTTER.
No. 570,472. Patented Nov. 3, 1896.
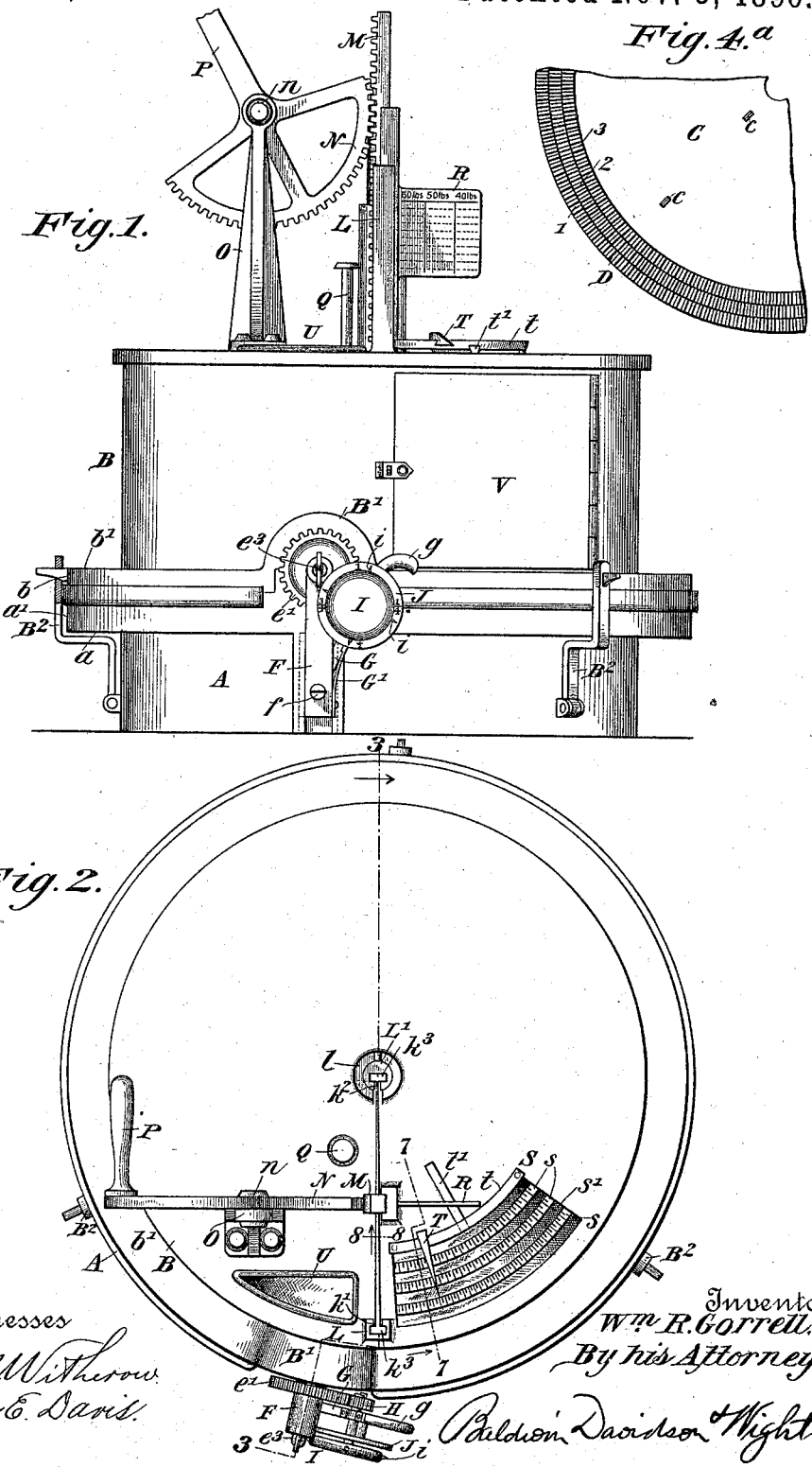
Witnesses
J. M. Witherow
Guy E. Davis
Inventor
Wm. R. Gorrell.
By his Attorneys,
Baldwin Davidson & Wight (No Model.) 2 Sheets—Sheet 2.
W. R. GORRELL.
CHEESE CUTTER.
No. 570,472. Patented Nov. 3, 1896.
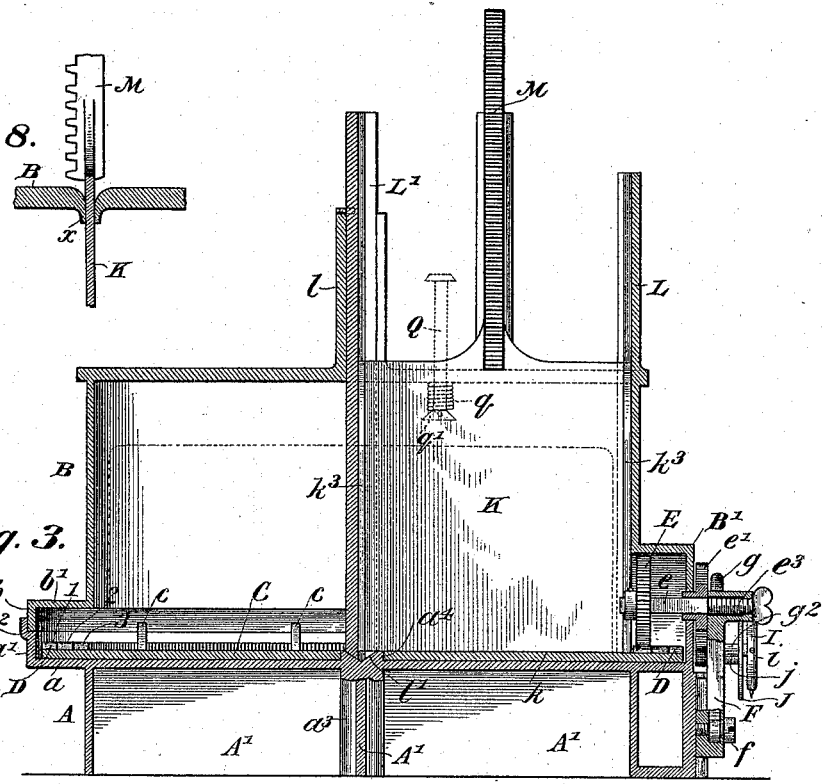
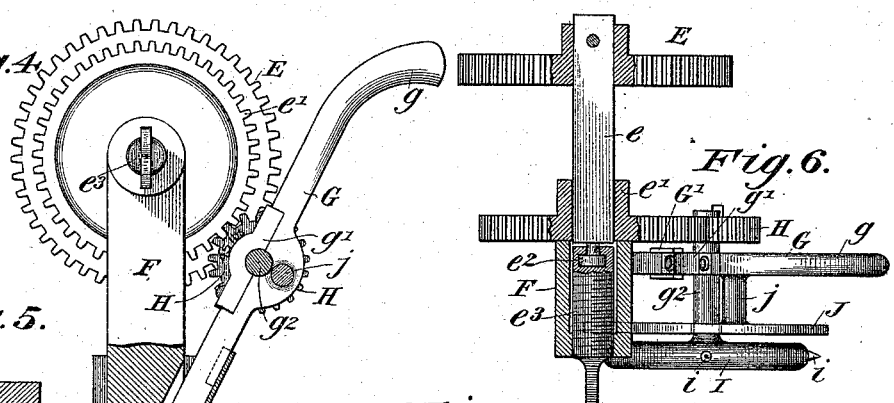
Witnesses
J. M. Witherow
Guy E. Davis
Inventor
Wm R. Gorrell,
By his Attorneys,
Baldwin, Davidson & Wight

UNITED STATES PATENT OFFICE.

WILLIAM R. GORRELL, OF CARSIN'S RUN, MARYLAND, ASSIGNOR, BY DIRECT AND MESNE ASSIGNMENTS, OF TWO-THIRDS TO EDWARD O. BAYLES AND SEPTIMUS DAVIS, OF HARFORD COUNTY, MARYLAND.

CHEESE-CUTTER.

SPECIFICATION forming part of Letters Patent No. 570,472, dated November 3, 1896.

Application filed March 23, 1896. Serial No. 584,570. (No model.)

*To all whom it may concern:*

Be it known that I, WILLIAM R. GORRELL, a citizen of the United States, residing at Carsin's Run, in the county of Harford and State of Maryland, have invented certain new and useful Improvements in Cheese-Cutters, of which the following is a specification.

My invention relates to that class of cheese-cutters in which the cheese is supported on a rotary table that is turned by suitable gearing to the proper extent to measure off the desired weight or amount to be severed by a vertically-reciprocating slicing-knife.

The object of my invention is to provide accurate gearing operated and adjusted in a novel and effective manner to measure off the desired amount on cheeses of different weights or sizes.

A further object of my invention is to provide additional measuring devices to be used in connection with the gearing above mentioned, or in place of it, to determine the size of the slice to be severed from cheeses of different sizes or to verify the work of the gearing.

In the accompanying drawings, Figure 1 shows a side elevation of a cheese-cutter embodying my improvements. Fig. 2 is a top plan view thereof. Fig. 3 shows a vertical central section on the line 3 3 of Fig. 2. Fig. 4 shows a view on an enlarged scale of part of the gearing for rotating the cheese-supporting table. Fig. 4$^a$ shows a detail view of part of the annular rows of teeth on the table. Fig. 5 is a cross-section on the line 5 5 of Fig. 4. Fig. 6 shows a view partly in plan and partly in section of the gearing shown in Fig. 4. Fig. 7 is a detail view in section on the line 7 7 of Fig. 2, but on an enlarged scale, of the supplemental measuring devices; and Fig. 8 shows a detail view in section of the slicing-knife and a part of the casing through which it operates.

The casing is in two main parts, A and B, the lower part A having an annular extension $a$ flanged at $a'$ and shouldered at $a^2$ to receive the flange $b$ on the extension $b'$ of the upper section B of the casing. Swinging catches $B^2$ are employed for securing together the two casing sections. The lower section A is provided with radial strengthening-ribs A' and with a central bearing-block $a^3$, which has a hub $a^4$, which extends through a central circular opening in the cheese-supporting table C. The table C is provided with spurs $c$ to extend into the cheese to hold it steady and to keep it from slipping. At the outer edge or periphery of the table are arranged annular series of teeth D, two or more preferably being employed. In the drawings I have shown three concentric rows, marked 1, 2, and 3, respectively. These teeth are adapted to gear with a pinion E, operated as hereinafter described, to rotate the table to turn the cheese beneath the slicing-knife.

The pinion E is arranged within a housing B', formed by offsets in the casing sections A and B, as shown in Figs. 1 and 3. Preferably, the pinion is mounted on a square shaft $e$ and extends through a cog $e'$ outside the housing B'. At its outer end it is swiveled at $e^2$, to an adjusting-screw $e^3$, mounted in the upper end of a supporting-bar F, which is dovetailed into a socket in the lower section A of the casing, and is adapted to move vertically therein. (See Fig. 5.)

A screw $f$, passing through the lower end of the arm F, serves to clamp the arm in its adjusted position. An arm G, pivoted on the screw $f$, extends diagonally upward therefrom through a recess $f'$ in the arm. At its upper end the arm G is provided with a handle $g$, and between its upper and lower ends it is provided with bearings $g'$ for the shaft $g^2$ of a pinion H, that gears with the pinion $e'$ on the shaft $e$, that carries the pinion E.

On the front end of the shaft $g^2$ is a hand-wheel I, having a series of pointers $i$. A disk J, through which the shaft $g^2$ passes, is secured to a bracket $j$, projecting from the arm G. This disk is provided with figures indicating pounds and fractions thereof. (See Fig. 1.) The hand-wheel may be adjusted to bring one of the pointers $i$ to the several marks indicated on the disk J, and when so adjusted will correspondingly turn the pinion H, and through the train of gearing before described will act upon the racks D to turn the cheese-supporting table C. A spring G' bears upon the arm G and holds the pinion H in gear with the cog e'.

The three racks D correspond with cheeses of different weights or sizes, such as forty, fifty, and sixty pounds. The slicing-knife K corresponds in width to one-half the diameter of the cheese, and it is preferably of a length somewhat greater than the height of the cheese, which latter is indicated by dotted lines in Fig. 3. The knife is provided with a sharp lower edge $k$, and it is thicker at its outer vertical edge $k'$ than it is at its inner vertical edge $k^2$. At each vertical edge it is secured to a vertical enlarged edge-bar $k^3$. The outer vertical bar $k^3$ moves in a guide L at the outer edge of the casing, and extending some distance above the top thereof. A central guide-bar L' extends through a housing $l$ on the top of the casing down through the cheese-chamber and into a socket $l'$ in the hub $a^4$. The edge-bar $k^3$ fits snugly in a vertical recess in the bar L', but is adapted to move freely vertically therein. A rack-bar M is secured to the upper edge of the knife near the middle thereof, and with this rack-bar gears a toothed segment N, pivoted in bearings $n$ on a standard O, secured to the top of the casing. The segment is provided with a handle P, by means of which it is operated to cause the knife to reciprocate vertically.

The knife is adapted to be moved above the top of the cheese, so that the cheese may move beneath the knife. When the cheese is moved to the proper extent by the gearing before described, the handle is operated to force the knife downward to slice off the proper amount corresponding with the desired weight. The shape of the knife is such as to make a clean cut without breaking off particles of the cheese. This result is attained by making the inner vertical edge of the knife narrower than the outer vertical edge. In other words, the knife is triangular in horizontal section. Should the cheese tend to rise with the knife, it may be separated therefrom by a push-bar Q, which extends through the top of the casing, and is normally held elevated by a spring $q$, interposed between the under side of the top and the enlargement or head $q'$ of the push-bar. The knife passes through a slot in the top of the casing, which is preferably flanged at $x$, as indicated in Fig. 8, and should particles of the cheese adhere to the knife they will be returned to the cheese-chamber, the knife being thus kept perfectly clean.

It will readily be understood that by adjusting the pinion E to gear with the proper rack-bar D the cheese-supporting table may be adjusted to the proper extent by the appropriate movement of the hand-wheel. Instead of employing three rack-bars D, however, I may make the pinion H removable, as indicated in Fig. 6, and replace it by another pinion. As shown in Fig. 4, the pinion H is adapted to operate when a cheese of forty-five pounds is used. I may have a pinion corresponding with cheeses weighing fifty or sixty pounds, &c. This same device may be combined with the three racks—that is to say, the three racks may be suitable for operating when cheeses of forty, fifty, or sixty pounds are employed—and separate pinions may be employed to operate when the cheeses are between these figures—for instance, forty-five or fifty-five pounds. I also employ a scale S on the top of the casing. As shown, three scale-bars $s$ are employed, indicating forty, fifty, and sixty pounds. These are arranged above the glass $s'$. A pointer T is supported on a curved bar $t$, that is adapted to slide radially on a rail $t'$. A dovetail connection is made between the pointer T and the bar $t$ and between the bar $t$ and the rail $t'$.

Gearing of any suitable kind may be employed to rotate the cheese-supporting table beneath the glass $s'$, and when the table is adjusted to the proper extent, as indicated by the index-finger F, the proper amount may be severed by the slicing-knife. The pointer T is adjusted to the proper scale $s$, according to the weight or size of the cheese. An index card or board R is secured to the guide-bar L, which should contain memoranda indicating the proper way of using the scales, and the pointer. For instance, the scale-bars may be divided into inches and fractions thereof, and the memoranda-board R should indicate the pounds or fractions thereof corresponding with the several sections.

A window U is arranged in the top of the casing in order that the interior of the cheese-chamber may be inspected. A door V is arranged in the side of the upper part of the casing, preferably near the gearing, which turns the cheese-supporting table, and in proximity to the slicing-knife, so that when a piece of cheese is severed the door may be opened and the slice removed. Slices may be repeatedly cut from the cheese by the proper operation of the gearing without any adjustment of the operating mechanism, but when a cheese of a different size is used the upper section of the casing may be raised and the pinion E properly adjusted, or the pinion H may be removed and another one of a different kind substituted. I contemplate also employing at the same time the three different arrangements described, viz., the three concentric racks D, the removable pinion H, and the scale S. All of these may be employed to obtain fine adjustments, the racks D and the pinion H for the larger adjustments, and the scale S for still finer ones, after the cheese is turned to the proper extent by the gearing.

I claim as my invention—

1. The combination of the casing, the cheese-supporting table, a series of rows of annular teeth around the edge of the table, a pinion adapted to gear with said teeth, means for adjusting the pinion from one series of teeth to the other, mechanism for actuating the pinion, and a vertically-reciprocating slicing-knife.

2. The combination of the casing, the cheese-supporting table, a series of rows of teeth around the edge of the table, a pinion adapted to gear with said rows of teeth, a shaft on which said pinion is mounted, a supporting-arm for the shaft, an adjusting-screw for moving the pinion from one series of teeth to another, and a vertically-reciprocating slicing-knife.

3. The combination of the casing, the cheese-supporting table, a series of rows of teeth at the periphery of the table, a pinion adapted to gear with said teeth, a cog-wheel secured to the shaft carrying the pinion, a pinion gearing with this cog-wheel, a hand-wheel on the shaft of the pinion, an index in proximity to the hand-wheel, and a vertically-reciprocating slicing-knife.

4. The combination of the casing, the cheese-supporting table, an annular row of teeth secured thereto, a pinion gearing with said teeth, a cog-wheel on the shaft of said pinion, a pinion gearing with said cog-wheel, means for turning said last-mentioned pinion, and a swinging arm on which the shaft of said pinion is mounted.

5. The combination of the casing, the cheese-supporting table, an annular series of teeth secured thereto, a pinion gearing with said teeth, a cog-wheel on the shaft of said pinion, a pinion gearing with said cog-wheel, an arm on which the shaft of the pinion is mounted, a spring for pressing the arm toward the cog-wheel, and a vertically-reciprocating slicing-knife.

6. The combination of the casing, the cheese-supporting table, means for revolving it, a glass in the top of the casing a series of curved scale-bars above the glass, a pointer adjustable longitudinally relatively to the scale-bars, and also transversely relatively thereto, and a vertically-reciprocating slicing-knife.

In testimony whereof I have hereunto subscribed my name.

WILLIAM R. GORRELL.

Witnesses:
CHAS. S. HILTON,
R. W. WELLS.